US012247430B1

(12) United States Patent
Qiu

(10) Patent No.: US 12,247,430 B1
(45) Date of Patent: Mar. 11, 2025

(54) GATE OPENING APPARATUS WITH GEAR ASSEMBLY

(71) Applicant: Qianliang Qiu, Pasadena, CA (US)

(72) Inventor: Qianliang Qiu, Pasadena, CA (US)

( * ) Notice: Subject to any disclaimer, the term of this patent is extended or adjusted under 35 U.S.C. 154(b) by 0 days.

(21) Appl. No.: 18/530,097

(22) Filed: Dec. 5, 2023

(51) Int. Cl.
*E05F 15/622* (2015.01)
*E06B 11/02* (2006.01)

(52) U.S. Cl.
CPC .......... *E05F 15/622* (2015.01); *E06B 11/022* (2013.01); *E05Y 2900/40* (2013.01)

(58) Field of Classification Search
CPC ......... E05F 15/622; E05F 15/63; E05F 15/53; E05Y 2900/40; E06B 11/022
See application file for complete search history.

(56) References Cited

U.S. PATENT DOCUMENTS 2,592,891 A * 4/1952 Hall ...................... E05F 15/622 49/340
4,616,444 A * 10/1986 Taylor ................... E05F 15/627 49/357
4,735,018 A * 4/1988 Duncan ................... E05F 15/53 49/340
4,782,628 A * 11/1988 Gaddis .................. E05F 15/622 49/340
4,934,203 A * 6/1990 Bailey ................... E05F 15/622 49/340
5,507,120 A * 4/1996 Current ................. E05F 15/622 74/89.33
5,804,938 A * 9/1998 Richmond ............ E05F 15/622 318/470
5,867,939 A * 2/1999 Merrill .................. E05F 15/627 49/346
5,869,940 A * 2/1999 Parsadayan ........... E05F 15/622 318/568.14
5,873,200 A * 2/1999 Henderson ............. E05F 15/63 49/343
6,138,412 A * 10/2000 Rieckmann ............. E05F 15/53 49/340
6,256,928 B1 * 7/2001 Skeem .................. E05F 15/622 49/340
6,742,303 B2 * 6/2004 Pedemonte ........... E05F 15/622 49/344
2003/0010142 A1 * 1/2003 Pedemonte ........... E05F 15/622 74/89.39
2004/0160205 A1 * 8/2004 Robb ................... G05B 19/351 318/468

(Continued)

*Primary Examiner* — Justin B Rephann
(74) *Attorney, Agent, or Firm* — Tsz Lung Yeung

(57) ABSTRACT

A gate opening apparatus for a door gate includes a housing, a motor, and a gear assembly. The gear assembly includes a gear rod and a driven member. The gear rod has one end connected to the motor without connecting through any clutching device, and another end extending toward a mounting portion of the housing. The driven member engages with the gear rod, in such a manner that when the gear rod is driven to rotate, the driven member is arranged to move along a longitudinal direction of the housing. The gate opening apparatus is arranged to be selectively operated between a power mode and a manual mode, wherein in the manual mode, the motor is cut off from electricity and is arranged to exert minimal mechanical resistance so that a user is able to manually move the door gate for opening or closing thereof.

4 Claims, 7 Drawing Sheets

(56) References Cited

U.S. PATENT DOCUMENTS

| | | | | |
|---|---|---|---|---|
| 2006/0284428 | A1* | 12/2006 | Beadle | E05B 47/026<br>292/302 |
| 2008/0061561 | A1* | 3/2008 | Uryasov | E05B 47/026<br>292/40 |
| 2009/0309375 | A1* | 12/2009 | Uryasov | E05B 65/0007<br>292/173 |
| 2011/0302841 | A1* | 12/2011 | Ye | E05F 15/622<br>49/340 |
| 2019/0284861 | A1* | 9/2019 | Goto | E05F 15/622 |

* cited by examiner

GATE OPENING APPARATUS WITH GEAR ASSEMBLY

BACKGROUND OF THE PRESENT INVENTION

Field of Invention

The present invention relates to a gate opening apparatus, and more particularly to a gate opening apparatus which is capable of allowing manual opening and closing of a gate when electricity is cut off.

Description of Related Arts

A conventional gate opening apparatus for actuating a pivotal movement of a door gate usually comprises an elongated outer housing having one end portion mounted on a supporting object such as a supporting column, a motor mounted in the outer housing, a gear assembly provided in outer housing, a clutching device coupled between the motor and the actuating mechanism, and a driving member connecting between the gear assembly and the door gate. During operation, the motor is activated to drive the door gate to move pivotally so as to drive the door gate to "open" or "close" at a designated space.

A main disadvantage in association with the above-mentioned gate opening apparatus is that the clutching device is utilized to allow manual operation of the door gate when electricity to the gate opening apparatus is cut off. When there is no electricity, the door gate cannot be manually opened or closed unless the clutching device is disengaged so as to disengage the gear assembly from the motor. However, the procedures of engaging or disengaging the clutching device is very troublesome and involve complicated mechanical steps. These steps may be easy for a trained technician. However, they are deemed complicated to a lay person who is usually an ordinary purchaser or a user of the conventional gate opening apparatus. As a result, the user may need the assistance of a technician for activating the manual operation of the gate opening apparatus. However, the assistance may not be available during non-business hours and this may bring extreme inconvenience to the user when the door gate cannot be manually opened or closed. What worse is that in some conventional gate opening apparatuses, a manual operation mode may not be available at all.

As a result, there is a need to improve upon the conventional gate opening apparatuses so as to resolve the above-mentioned problem.

SUMMARY OF THE PRESENT INVENTION

Certain variations of the present invention provide a gate opening apparatus which is capable of allowing manual opening and closing of a gate when electricity is cut off.

Certain variations of the present invention provide a gate opening apparatus which does not utility any clutching device in achieving manual operation of the door gate.

In one aspect of the present invention, it provides a gate opening apparatus for a door gate, comprising:

a housing having a supporting portion connected to an external anchor, and a mounting portion extending toward the door gate, the housing having a receiving cavity and an engagement slot communicating the receiving cavity with an exterior of the housing;

a motor received in the receiving cavity of the housing;

a gear assembly, which comprises:

a gear rod having one end connected to the motor without connecting through any clutching device, and another end extending in the receiving cavity toward the mounting portion of the housing, the gear rod having a plurality of first teeth spirally formed thereon; and a driven member having a plurality of second teeth engaging with the first teeth of the gear rod, in such a manner that when the gear rod is driven to rotate, the driven member is arranged to move along a longitudinal direction of the housing, the driven member being connected to the door gate;

wherein the gate opening apparatus is arranged to be selectively operated between a power mode and a manual mode, wherein in the power mode, the motor is electrically activated to drive the gear rod to rotate so as to drive the driven member to move along a longitudinal direction of the housing for driving the door gate to move in a pivotal manner with respect to the external anchor, wherein in the manual mode, the motor is cut off from electricity and is arranged to exert minimal mechanical resistance so that a user is able to manually move the door gate for opening or closing thereof.

This summary presented above is provided merely to introduce certain concepts and not to identify any key or essential features of the claimed subject matter.

DETAILED DESCRIPTION OF THE PREFERRED EMBODIMENT

Figure 1:
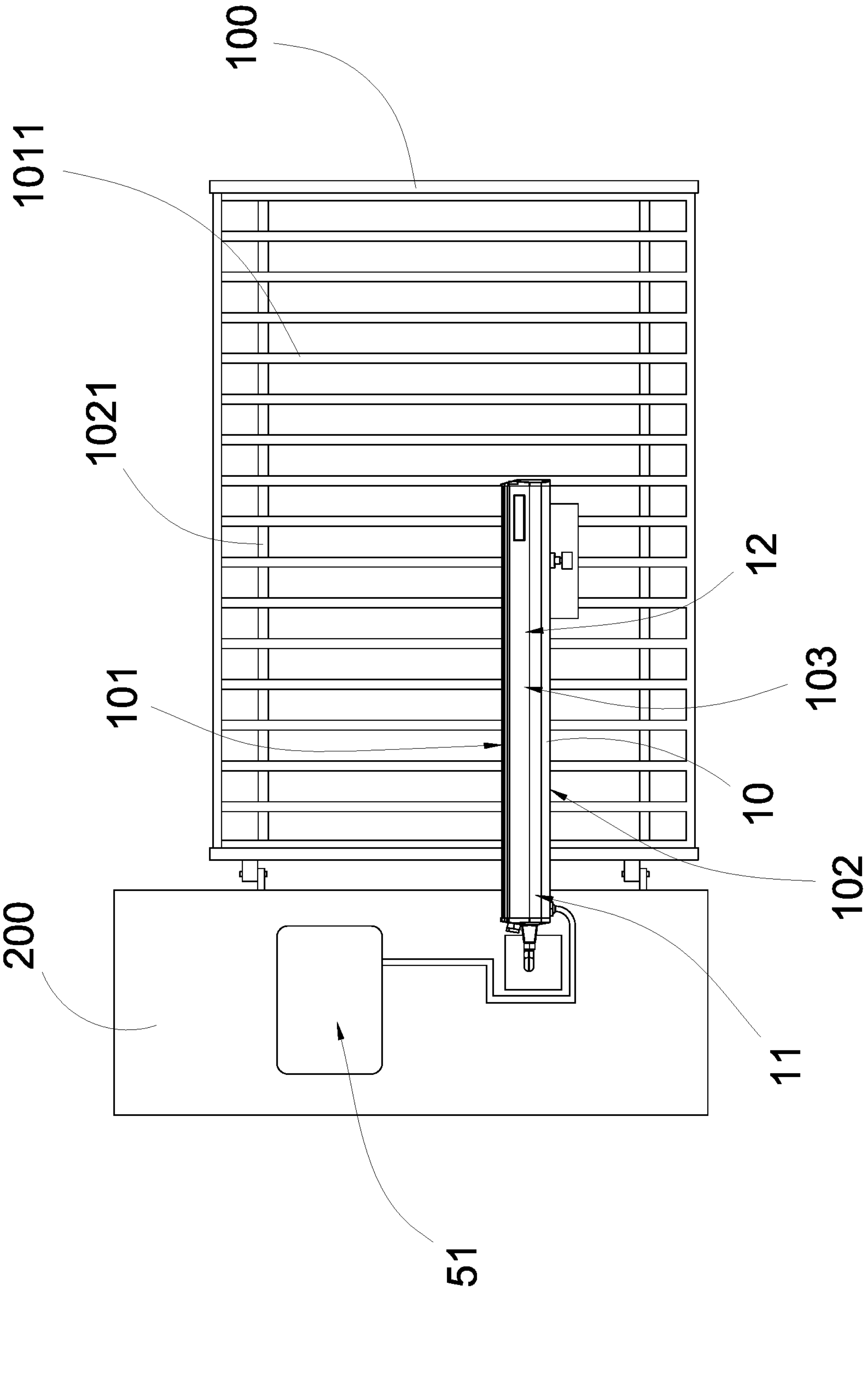
FIG. 1 a schematic diagram of a gate opening apparatus according to a preferred embodiment of the present invention.

The following detailed description of the preferred embodiment is the preferred mode of carrying out the invention. The description is not to be taken in any limiting sense. It is presented for the purpose of illustrating the general principles of the present invention.

It should be appreciated that the terms "length", "width", "top", "bottom", "front", "rear", "left", "right", vertical", "horizontal", "upper", "lower", "exterior", and "interior" in the following description refer to the orientation or positioning relationship in the accompanying drawings for easy understanding of the present invention without limiting the actual location or orientation of the present invention. Therefore, the above terms should not be an actual location limitation of the elements of the present invention.

It should be appreciated that the terms “first”, “second”, “one”, “a”, and “an” in the following description refer to “at least one” or “one or more” in the embodiment. In particular, the term “a” in one embodiment may refer to “one” while in another embodiment may refer to “more than one”. Therefore, the above terms should not be an actual numerical limitation of the elements of the present invention.

It should be appreciated that the terms “install”, “connect”, “couple”, and “mount” in the following description refer to the connecting relationship in the accompanying drawings for easy understanding of the present invention. For example, the connection can refer to permanent connection or detachable connection. Therefore, the above terms should not be an actual connection limitation of the elements of the present invention.

Referring to FIG. 1 to FIG. 6 of the drawings, a gate opening apparatus according to a preferred embodiment of the present invention is illustrated. Broadly, the gate opening apparatus may comprise a housing 10, a motor 20, and a gear assembly 30. The gate opening apparatus of the present invention is for pivotally opening or closing a door gate 100.

The housing 10 may have a supporting portion 11 connected to an external anchor 200 such as a column or a wall provided near the door gate 100, and a mounting portion 12 extending toward the door gate 100. The housing 10 may have a receiving cavity 13 and an engagement slot 14 communicating the receiving cavity 13 with an exterior of the housing 10.

The motor 20 may be received in the receiving cavity 13 of the housing 10. The gear assembly 30 may comprise a gear rod 31 and a driven member 32. The gear rod 31 may have a first end 311 connected to the motor 20 without connecting through any clutching device, and a second end 312 extending in the receiving cavity 13 along the mounting portion 12 of the housing 10. The gear rod 31 may have a plurality of first teeth 313 spirally formed thereon.

Figure 5:
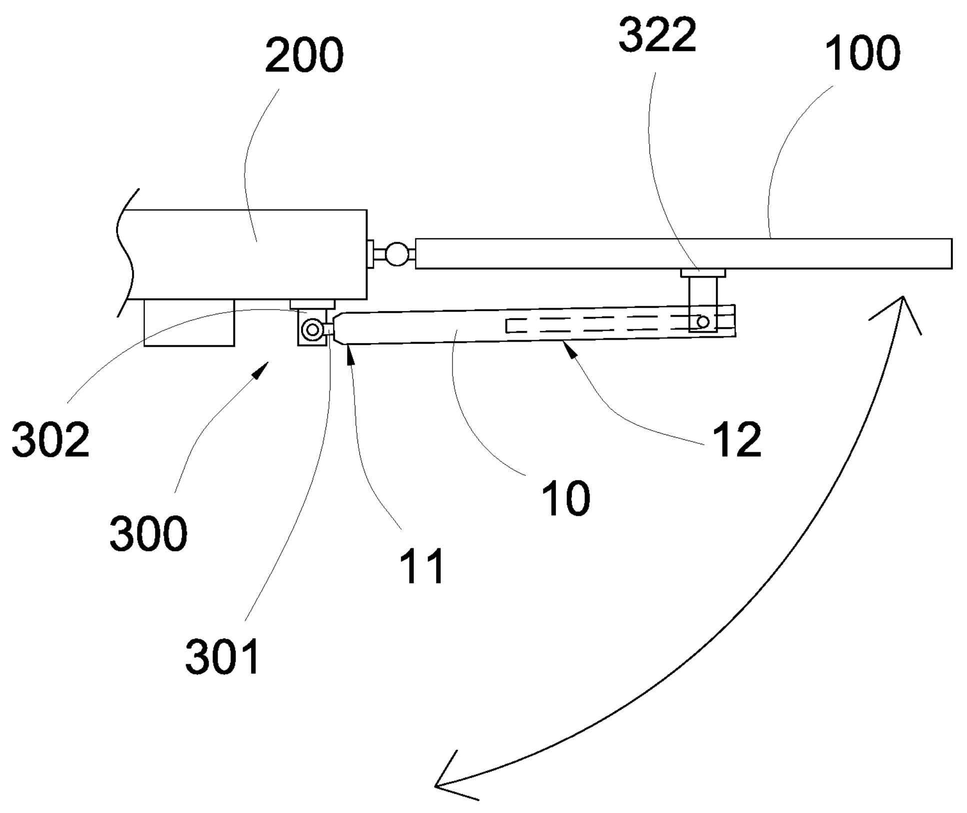
FIG. 5 is schematic diagram illustrating an operation of the gate opening apparatus, wherein a door gate is driven to a closed position.
Figure 6:
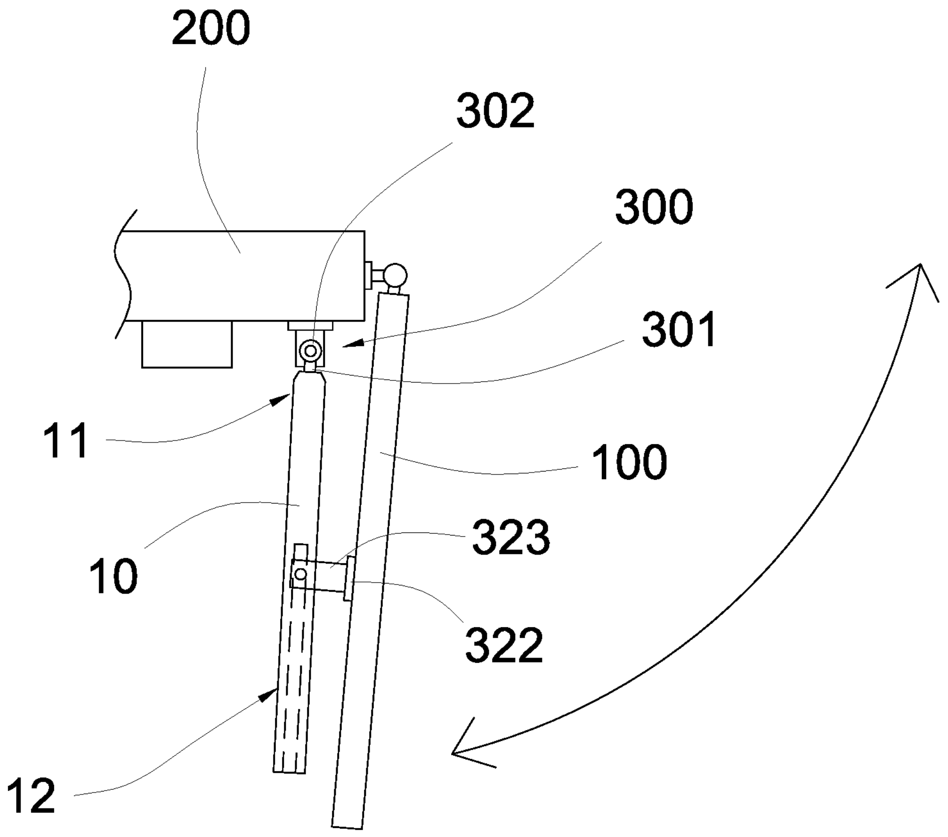
FIG. 6 is schematic diagram illustrating an operation of the gate opening apparatus, wherein the door gate is driven to an opened position.

The driven member 32 may have a plurality of second teeth 321 engaging with the first teeth 313 of the gear rod 31, in such a manner that when the gear rod 31 is driven to rotate, the driven member 32 may be arranged to move along a longitudinal direction of the gear rod 31 and the housing 10. The driven member 32 may be connected to the door gate 100, as shown in FIG. 1, and FIG. 5 to FIG. 6 of the drawings.

The gate opening apparatus of the present invention may be arranged to be selectively operated between a power mode and a manual mode, wherein in the power mode, the motor 20 may be electrically activated to drive the gear rod 31 to rotate so as to drive the driven member 32 to move along a longitudinal direction of the housing for driving the door gate 100 to move in a pivotal manner with respect to the external anchor 200, wherein in the manual mode, the motor 20 is cut off from electricity and is arranged to exert minimal mechanical resistance so that a user is able to manually move the door gate 100 for opening or closing thereof.

According to the preferred embodiment of the present invention, the gate opening apparatus may be utilized for a door gate 100 having an elongated structure. The door gate 100 may comprise a plurality of transverse members 1011 and a plurality of longitudinal members 1021 and may pivotally move on a ground surface, with or without being assisted by a plurality of wheels. The external anchor 200 may be a supporting member for supporting the gate opening apparatus. The external anchor 200 may be a column, an external wall, or other suitable structures.

The housing 10 may be configured from metallic material and may be elongated in shape. The supporting portion 11 may be a corresponding end portion of the housing 10, while the mounting portion 12 may extend from the supporting portion 11. The supporting portion 11 may be mounted on the external anchor 200, while the mounting portion 12 may extend along a longitudinal direction of the door gate 100. In order to facilitate pivotal movement of the door gate 100, the supporting portion 12 of the housing 10 may be pivotally mounted with respect to the external anchor 200, preferably through a joint assembly 300 comprising a first pivotal arm 301 outwardly and longitudinally extending from the supporting portion 11, and a second pivotal arm 302 pivotally connecting between the external anchor 200 and the first pivotal arm 301.

Figure 2:
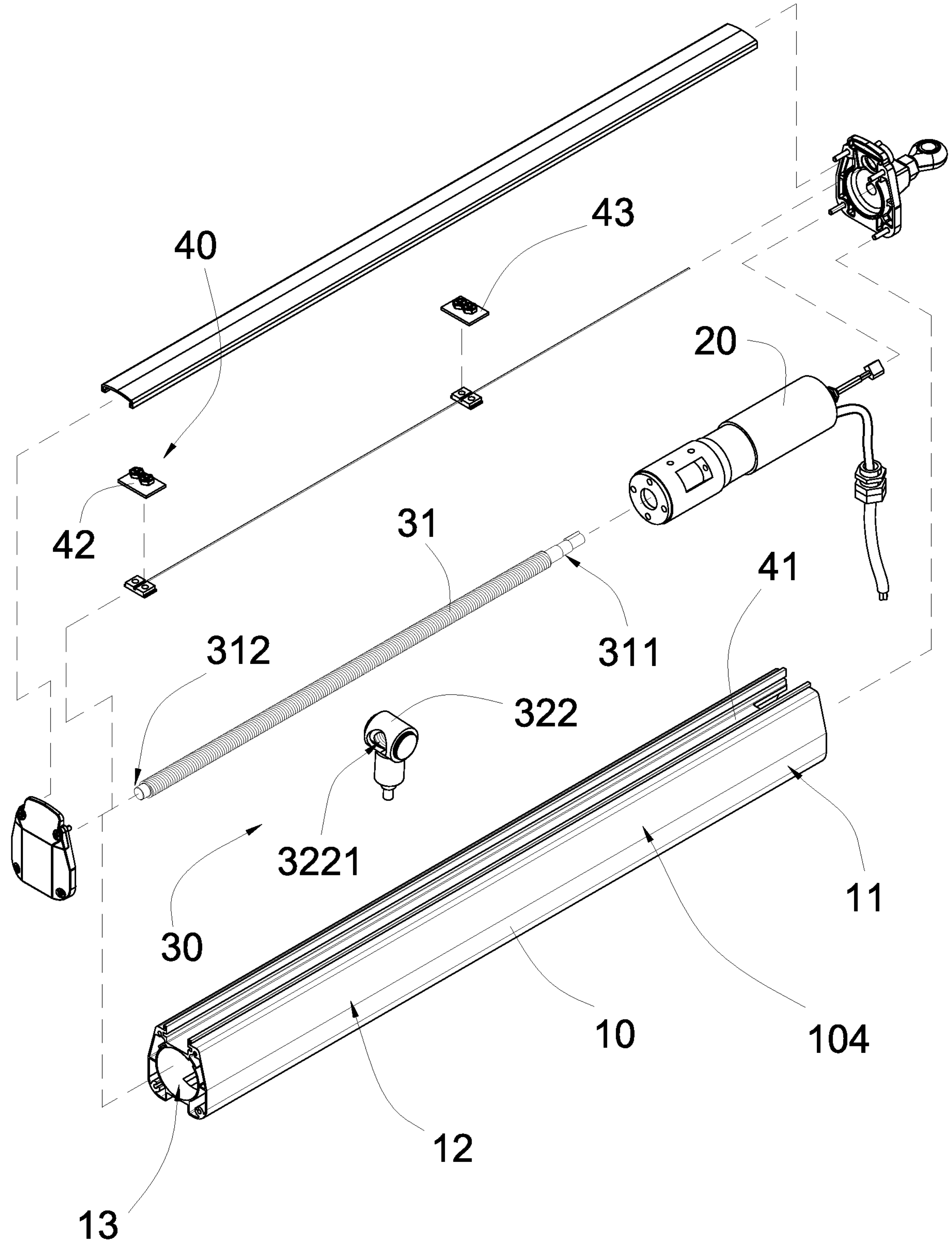
FIG. 2 is a perspective view of the gate opening apparatus according to the preferred embodiment of the present invention.
Figure 3:
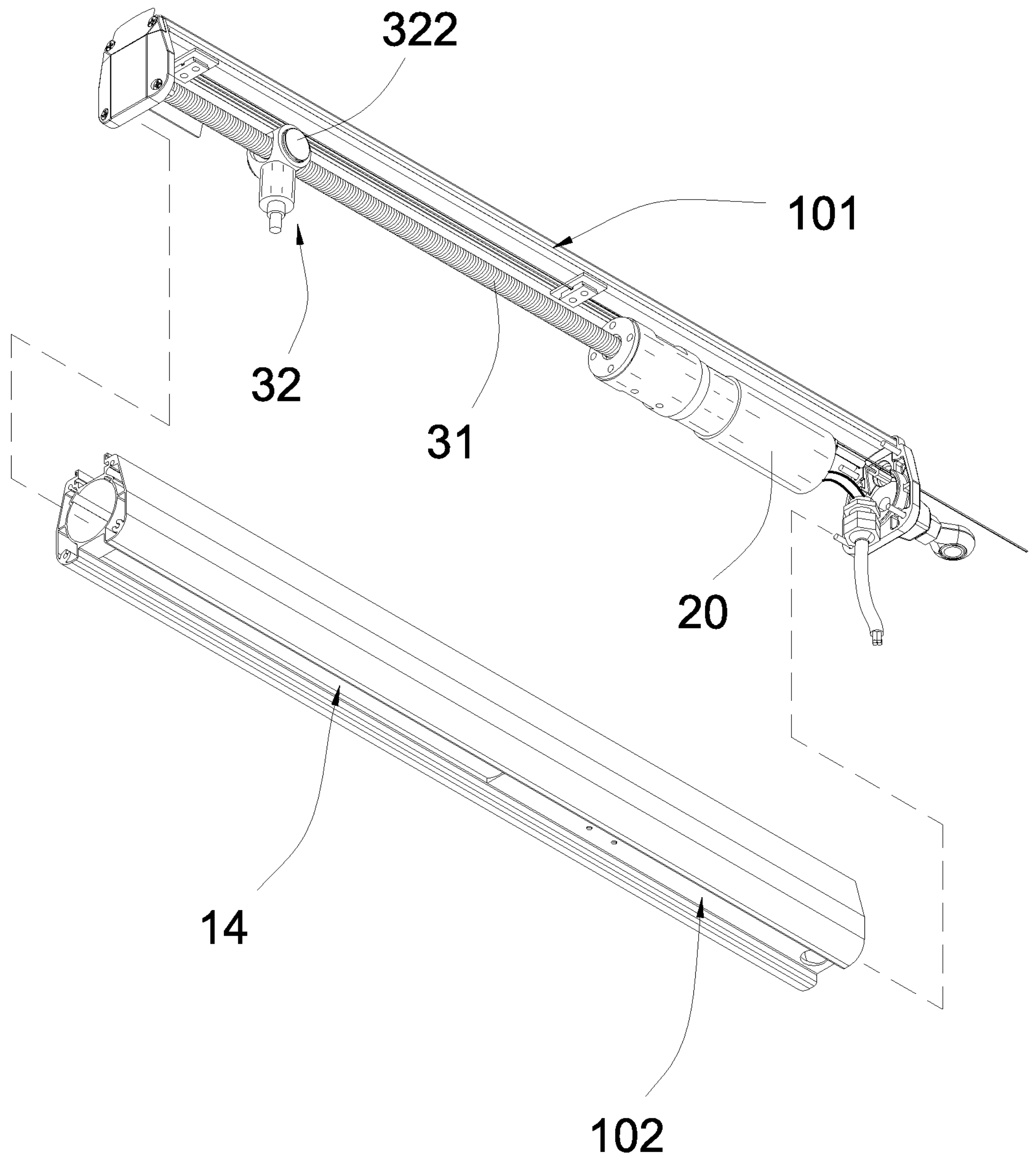
FIG. 3 is a bottom exploded perspective view of the gate opening apparatus according to the preferred embodiment of the present invention.
Figure 4:
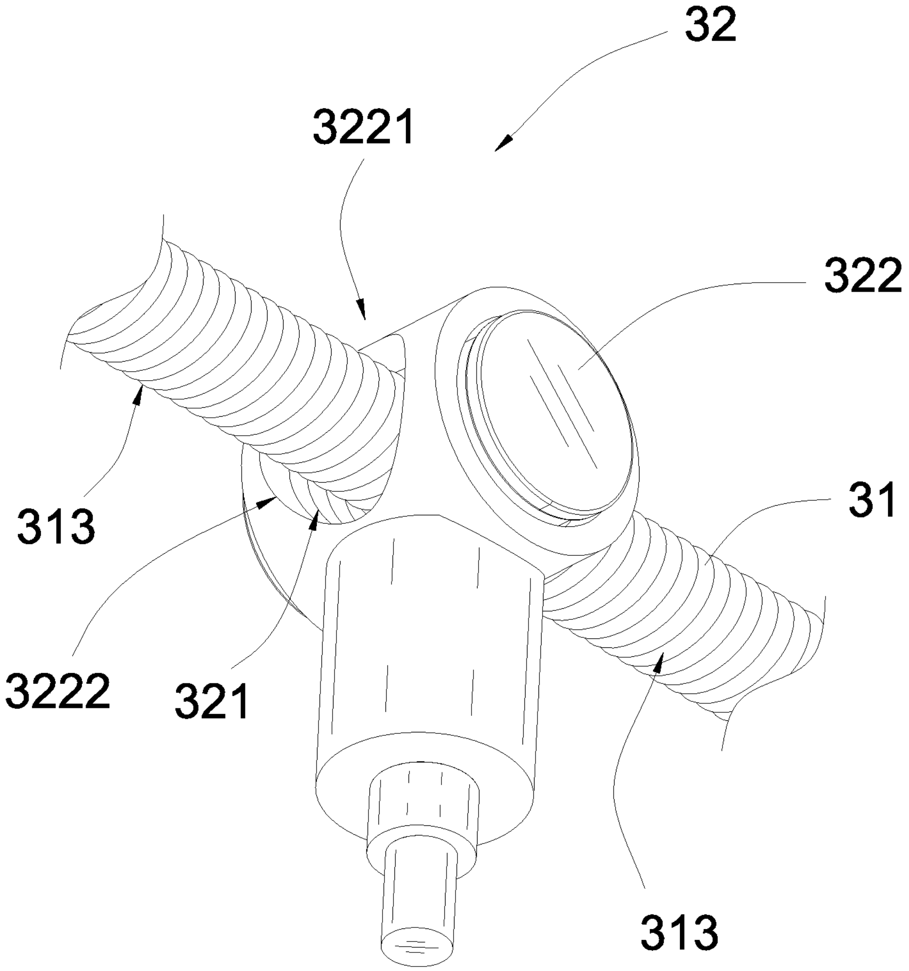
FIG. 4 is an enlarged diagram of a driven member of a gear assembly of the gate opening apparatus according to the preferred embodiment of the present invention.

As shown in FIG. 1 to FIG. 3 of the drawings, the housing 10 may extend alongside the door gate 100 with the supporting portion 11 pivotally mounted on the external anchor 200. More specifically, the housing 10 may have a top side 101, a bottom side 102, a front side 103 and a rear side 104 to form a substantially rectangular structure, wherein the engagement slot 14 may be formed on the bottom side 102 of the housing 10 along a longitudinal direction thereof. The rear side 104 of the housing 10 may be arranged to extend alongside the door gate 100. In this preferred embodiment of the present invention, the mounting portion 12 of the housing 10 may be pivotally connected to the door gate 100 at a distance from the external anchor 200.

The motor 20 may be supported in the receiving cavity 13 of the housing 10 at the supporting portion 11 thereof. The motor 20 may be configured as a synchronous motor and may be arranged to drive the gear assembly 30 to rotate. A feature of the motor 20 is that when the motor 20 is connected to a power source, such as a powered control unit (described below), the motor 20 may be arranged to possess a predetermined amount of mechanical resistance so as to prevent users from manually opening or closing the door gate 100. In other words, in normal situation, the door gate 100 will be fully controlled by the gate opening apparatus and users may be prevented from manually opening or closing the door gate 100 due to the mechanical resistance of the motor 20.

The gear assembly 30 may be operatively coupled to the motor 20. More specifically, the gear rod 31 may have the first end 311 connected to the motor 20, and the second end 312 extending from the first end 311 toward the mounting portion 12 of the housing 10. When the motor 20 is actuated, the gear rod 31 may rotate accordingly.

The driven member 32 may be movably coupled to the gear rod 31 in such a manner that when the gear rod 31 is driven to rotate, the driven member 32 may be driven to move along a longitudinal direction of the gear rod 31.

The driven member 32 may comprise an engagement body 322 having a through hole 3221, wherein the second teeth 321 may be formed on a circumferential boundary 3222 of the through hole 3221. The gear rod 31 may be arranged to pass through the through hole 3221, in such a manner that the first teeth 313 may engage with the second teeth 321. Thus, when the gear rod 31 is driven to rotate, the engagement body 322 may be driven to move along the longitudinal direction of the gear rod 31.

As shown in FIG. 3 of the drawings, the engagement body 322 may be configured as having a cylindrical or cubic structure and may be arranged to extend out of the engagement slot 14 so as to partially expose out of the receiving cavity 13. Note that the geometrical shape of the engagement body 322 may be varied to fit different circumstances in which the present invention is manufactured or operated.

Furthermore, the driven member 32 may further comprise a coupling arm 323 pivotally connecting the engagement body 322 to the door gate 100 so that when the engagement body 322 is driven to move along the gear rod 31, the coupling arm 323 may transmit the mechanical force to the door gate 100 and tend to pivotally open or close the door gate 100 with respect to the external anchor 200. The coupling arm 323 may be securely connected to the door gate 100 by conventional mechanical methods, such as welding, using screws or other methods.

The gate opening apparatus may further comprise a range adjustment mechanism 40 provided on the housing 10 for setting a range of motion of the driven member 32. Specifically, the range adjustment mechanism 40 may comprise a sliding track 41 mounted on the top side 101 of the housing 10, and a first and a second adjustment sliders 42, 43 slidably mounted on the sliding track 41. The first adjustment slider 42 and the second adjustment slider 43 may be spaced apart from each other on the sliding track 41, wherein a distance between the first adjustment slider 42 and the second adjustment slider 43 may dictate the range of motion on the part of the driven member 32.

Referring to FIG. 2 of the drawings, each of the first adjustment slider 42 and the second adjustment slider 43 may be adjustably and slidably mounted on the sliding track 41 so that each of them may be locked in position, or unlocked to freely slide on the sliding track 41. A plurality of markings may be provided on the sliding track 41 so that a user may be able to observe the positions of each of the first adjustment slider 42 and the second adjustment slider 43 with respect to the sliding track 41.

Figure 7:
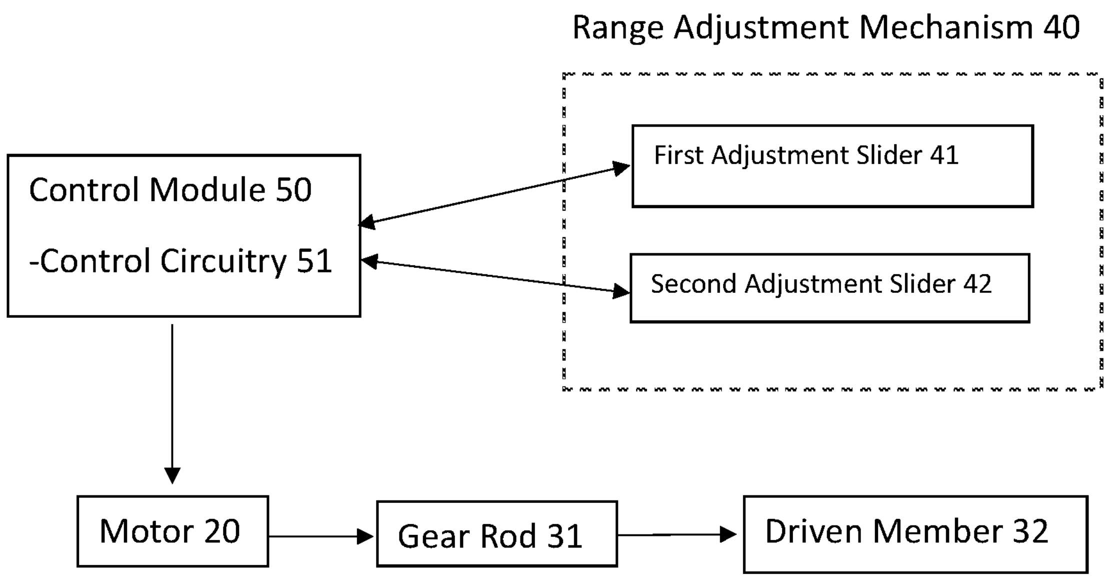
FIG. 7 is a schematic diagram illustrating the interaction between a motor, a range adjustment mechanism and a control module according to the preferred embodiment of the present invention.

As shown in FIG. 7 of the drawings, the gate opening apparatus may further comprise a control module 50 which may comprise a control circuitry 51 electrically connected to the motor 20 and the range adjustment mechanism 40 for controlling a driving operation of the motor 20. The control circuitry 51 may be mounted and physically protected in a protective box 51 which may be mounted on the external anchor 200.

The control circuitry 51 may be electrically connected to the motor 20 so that it may activate the operation thereof. When the gate opening apparatus is in the power mode, the control circuitry 51 may activate the motor 20 so as to drive the motor 20 to rotate in a predetermined direction. The rotation of the motor 20 may drive the gear rod 31 to rotate as well and this in turn drive the driven member 32 to move along the gear rod 31. Since the driven member 32 may be pivotally connected to the door gate 100 through the coupling arm 323, the linear movement of the driven member 32 along the gear rod 31 may drive the door gate 100 to pivotally move with respect to the external anchor 200.

Furthermore, each of the first adjustment slider 42 and the second adjustment slider 43 may be electrically connected to the control circuitry 51. Each of the first adjustment slider 42 and the second adjustment slider 43 may be in magnetic communication with the driven member 32 so that when the driven member 32 is moved to one of the first adjustment slider 42 and the second adjustment slider 43, electrical signals may be transmitted to the control circuitry 51 for deactivating the motor 20. This may have the effect of stopping the rotation of the gear rod 31 and the driven member 32 so as to stop the pivotal movement of the door gate 100.

The control circuitry 51 may be configured to activate the motor 20 again to drive the gear rod to rotate in opposite direction so as to drive the door gate 100 to pivotally close or to pivotally open when the user desires.

In the power mode, the motor 20 may be arranged to exert substantial resistance so that a user may not be able to manually pull or push the door gate 100 for pivotally moving it. In other words, when the gate opening apparatus is in normal operation, manual opening or closing the door gate 100 will not be allowed.

When the gate opening apparatus is in the manual mode, the supply of electricity to the motor 20 is cut off. The substantial resistance possessed by the motor 20 will ceases to exist without any involvement of clutching device so that a user is able to manually push or pull the door gate 100 so as to allow the door gate 100 to move pivotally with respect to the external anchor 200. It is important to mention that this feature is distinctive with respect to conventional gate opening apparatuses in which clutching devices must be used when electricity is cut off for allowing manual movement of the corresponding door gate.

The present invention, while illustrated and described in terms of a preferred embodiment and several alternatives, is not limited to the particular description contained in this specification. Additional alternative or equivalent components could also be used to practice the present invention.

What is claimed is:

1. A gate opening apparatus, comprising:

a housing having a supporting portion pivotally connected to an external anchor, and a mounting portion extending toward a door gate, the housing having a receiving cavity and an engagement slot communicating the receiving cavity with an exterior of the housing;

a motor received in the receiving cavity of the housing, the motor being configured as a synchronous motor;

a gear assembly, which comprises:

a gear rod having one end connected to the motor without connecting through any clutching device, and another end extending in the receiving cavity toward the mounting portion of the housing, the gear rod having a plurality of first teeth spirally formed thereon; and a driven member connecting to the door gate, the driven member comprising an engagement body and having a plurality of second teeth forming on the engagement body and engaging with the first teeth of the gear rod, in such a manner that when the gear rod is driven to rotate, the driven member is arranged to move along a longitudinal direction of the housing, the engagement body having a through hole, wherein the second teeth are formed on a circumferential boundary of the through hole, the gear rod being arranged to pass through the through hole, in such a manner that the first teeth are arranged to engage with the second teeth, so that when the gear rod is driven to rotate, the engagement body is driven to move along the longitudinal direction of the gear rod, the driven member further comprising a coupling arm pivotally connecting the engagement body to the door gate so that when the engagement body is driven to move along the gear rod, the coupling arm is arranged to transmit a mechanical force to the door gate and to pivotally open or close the door gate with respect to the external anchor; and a range adjustment mechanism which comprises a sliding track mounted on the top side of the housing, and a first and a second adjustment sliders slidably mounted on the sliding track, the first adjustment slider and the second adjustment slider being spaced apart from each other on the sliding track, wherein a distance between the first adjustment slider and the second adjustment slider dictates a range of motion on the driven member;

the motor being arranged to drive the gear assembly to rotate, in such a manner that when the motor is connected to a power source, the motor is arranged to possess a predetermined amount of mechanical resistance so as to prevent users from manually actuating the motor for opening or closing the door gate;

the gate opening apparatus being arranged to be selectively operated between a power mode and a manual mode, wherein in the power mode, the motor is electrically activated to drive the gear rod to rotate so as to drive the driven member to move along a longitudinal direction of the housing for driving the door gate to move in a pivotal manner with respect to the external anchor, wherein in the manual mode, the motor is cut off from electricity and is arranged to exert minimal mechanical resistance so that a user is able to manually move the door gate for opening or closing thereof.

2. The gate opening apparatus, as recited in claim 1, further comprising a control module which comprises a control circuitry electrically connected to the motor and the range adjustment mechanism for controlling a driving operation of the motor, each of the first adjustment slider and the second adjustment slider are electrically connected to the control circuitry and in magnetic communication with the driven member so that when the driven member is moved underneath one of the first adjustment slider and the second adjustment slider, electrical signals are transmitted to the control circuitry for deactivating the motor.

3. The gate opening apparatus, as recited in claim 2, wherein the housing has a top side, a bottom side, a front side and a rear side to form a substantially rectangular structure, wherein the engagement slot is formed on the bottom side of the housing along a longitudinal direction thereof.

4. The gate opening apparatus, as recited in claim 3, wherein the mounting portion of the housing extends from the supporting portion, and is adapted for pivotally mounting on the door gate.

* * * * *